Oct. 10, 1933.        J. G. BENTLEY ET AL        1,930,075
COMBINED BRAKE AND CLUTCH RELEASE FOR LOOMS
Filed Feb. 18, 1931
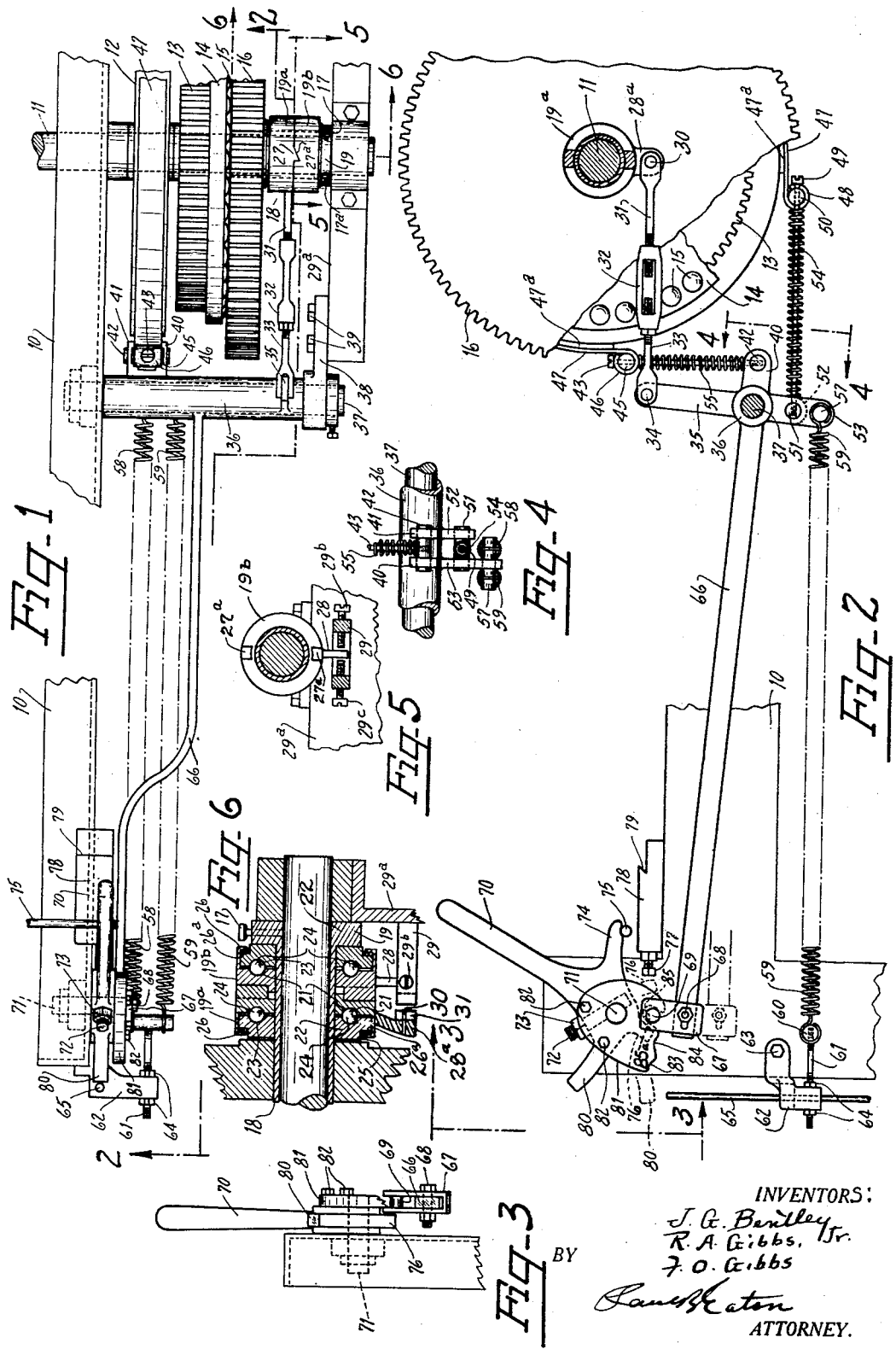
INVENTORS:
J. G. Bentley
R. A. Gibbs, Jr.
F. O. Gibbs
ATTORNEY.

Patented Oct. 10, 1933

1,930,075

UNITED STATES PATENT OFFICE 1,930,075

COMBINED BRAKE AND CLUTCH RELEASE FOR LOOMS

John G. Bentley, Robert A. Gibbs, Jr., and Francis O. Gibbs, Greensboro, N. C.

Application February 18, 1931. Serial No. 516,584

15 Claims. (Cl. 192—17)

This invention relates to a stopping mechanism for looms and more especially to means adapted to be operated by any of the several stop motions of a loom for instantaneously applying the brakes to the loom and releasing the clutch, with means for regulating the sequence of the stopping and braking operation so as to insure a positive and quick stopping of the loom when any of the stop motions operate such as the center or end filling stop motions, the feeler stop motion, the warp stop motion, or the shuttle stop motion such as occurs when a shuttle is not properly placed in the box of the lay.

Heretofore, it has been the experience in the operation of looms that when any of the stop motions above enumerated are actuated to stop the loom, that the stopping will not be positive and quick enough to prevent imperfections occurring in the cloth being woven by the loom, and it is an object of this invention to provide means whereby the stop motions, above enumerated, will all operate on a single means associated with the loom to automatically release the clutch of the loom and to instantaneously apply the brake to insure a quick stoppage of the loom after the clutch has been released.

It is an object of this invention to provide a single lever having connection with the shipper lever whereby both the brakes and clutch are controlled by this lever, in cooperation with an improved clutch for the loom.

Some of the objects of this invention having been stated, other objects will appear as the description proceeds when taken in connection with the accompanying drawing in which—

Figure 1 is a plan view with parts broken away showing the clutch end of a loom and showing the invention applied thereto;

Figure 2 is a side elevation of Figure 1 with parts thereof being in cross section, the view being taken along the line 2—2 in Figure 1;

Figure 3 is a detailed view taken along the line 3—3 in Figure 2, with a portion of cam 81 broken away;

Figure 4 is a detailed view taken along the line 4—4 in Figure 2;

Figure 5 is a detailed view taken along the line 5—5 in Figure 1;

Figure 6 is a longitudinal cross-sectional view taken along line 6—6 in Figure 1.

Referring more specifically to the drawing, the numeral 10 indicates the end framework of a loom, while the reference character 11 indicates the main crank shaft of a loom which has fixed thereon a brake drum 12. A gear wheel 13 is also fixedly mounted on shaft 11, and also fixedly associated with shaft 11 is a disk 14 which has in one of the side surfaces thereof a plurality of cork inserts 15 which are adapted to engage one of the side surfaces of a constantly driven gear 16 which is loosely mounted on shaft 11. Fixedly secured on shaft 11 by means of set screws 17 and 17a is a collar 18 which has a flange 19 on one end thereof. Driven gear 16 is rotatably mounted on one end of said collar. A clutch operating mechanism is loosely mounted on collar 18 and comprises similar parts 19a and 19b. Part 19b is milled out in one end and has a race ring 21 therein. Disk 22 is loosely mounted in the milled out portion and has a race ring 23 therein coinciding with race ring 22, and balls 24 are mounted therein. Member 22 has a peripheral groove 25 over which portion 26 of member 19a is counter shrunk. Member 19a has dogs 27 projecting from one side thereof which engage cavities 27a in portion 19b when the clutch is released. The structure of portion 19b is the same as portion 19a and like reference characters apply, except 19b has an arm 28 projecting downward therefrom which extends into U-shaped member 29 secured to member 29a and set screws 29b and 29c are secured in member 29 and may be adjusted to allow limited movement of portion 19b before dogs 27 start riding out of cavities 27a to apply the clutch. The downwardly projecting portion 28a on a member 19a has a pin 30 therein on which is pivotally mounted a rod 31 which is threadably secured in a turnbuckle 32, and to the other end of this turnbuckle 32 is threadably secured a rod 33 which is pivotally connected as at 34 to arm 35 projecting upwardly from collar 36 which collar is loosely mounted on shaft 37 which shaft is supported in a bracket 38 secured to member 29a by means of bolts 39. At the other end of this shaft is supported in the framework 10 of the loom.

Collar 36 has projecting therefrom arms 40 and 41 which have mounted in the end thereof a pin 42 through which is secured a rod 43 which rod projects upwardly and is slidably mounted in a pin 45 around which is wrapped a portion 46 of the brake band, said rod 43 being slidably mounted at its upper end and threadably secured in pin 42 at its lower end. This brake band is indicated by reference character 47 and extends around the brake drum 12 and is curled at its other end as at 48 and a rod 49 penetrates this curled portion and also a pin 50 therein, and this rod extends inwardly and is secured to a pin 51 by being threadably embedded in said pin 51.

Pin 51 is mounted between arms 52 and 53 which project downwardly from collar 36 and around rod 49 is a compression spring 54. Likewise, rod 43 has a compression spring 55 loosely mounted therearound, the purpose of these two compression springs being to normally exert a tendency toward loosening the brake and, therefore, relieves the necessity of extra heavy rods, when the brakes are released they have a tendency to loosen the brakes and to serve for a cushioning effect on the brakes. Arm 53 projects downwardly farther than arm 52 and in the lower end thereof, a pin 57 is secured and on this pin 57 one end of compression springs 58 and 59 are secured, said compression springs extending across the end of the loom and being secured to a pin 60 which is fixedly secured on a threaded rod 61, said threaded rod 61 being adjustably secured in a bracket 62 which is secured to the framework of the loom as at 63 and said rod 61 being adjustably mounted by means of nuts 64 located on both sides of bracket 62. This bracket 62 serves to support the rod 65 which is a part of the feeler motion for stopping the loom. The feeler motion is conventional and, therefore, only this portion of it is shown.

Integral with collar 36 is an extended lever 66 which extends across the end of the loom and adjustably mounted on the end of lever 66 is a U-shaped member 67 which is held in adjusted position by means of bolt 68 and in the open end of this U-shaped member a roller 69 is secured, the purpose of this structure being to allow the shipper lever 70 to operate the clutch to release the same and to automatically apply the brake when in the position shown in Figure 2 and when the shipper lever is moved all the way to the left in Figure 2 the brakes will be released and the clutch will be set in operation for the driving of the loom.

The shipper lever 70 is fixedly mounted on shaft 71 by means of boring a hole across one side of the hole in the shipper lever through which the shaft 71 is to pass then inserting bolt 72 in position and re-boring hole in which shaft 71 fits, which will cut a cavity out of the side of bolt 72, and then inserting the shipper lever 70 with bolt 72 in position on shaft 71 and tightening bolt 72 by means of nuts 73. This shipper lever 70 has an arm 74 which is adapted to engage rod 75 which is a portion of the center filling motion control which operates to place the shield in position to prevent the dagger from engaging the cam. The center filling motion and the operation thereof is not shown, but this operation in connection with the shipper lever for stopping the loom is conventional.

Shipper lever 70 also has a projection 76 which in normal operation and when the loom is running, occupies the dotted line position shown in Figure 2 in close proximity to screw 77 which is adjustably mounted in live frog 78 which has a notch 79 which is adapted to be engaged by the frog on the lay of the loom when the shuttle is not properly positioned in the box so the frog on the lay of the loom will engage the live frog 78 and push the projection 76 and throw the shipper lever to the position shown in Figure 2. The operation described for the shuttle motion for stopping the loom can, likewise, apply to the center filling motion as it also operates to knock the shipper lever to the position in Figure 2 when the said stop motion is operated for stopping the loom, and as the stop motions form no part of the invention, it is not thought that a disclosure of the same is necessary.

Projecting from the shipper lever 70 is another lug 80 which, when the shipper lever is in normal position to allow the loom to run, occupies dotted line position shown in Figure 2 in close proximity to vertically disposed rod 65 so that when the feeler motion operates to stop the loom, this rod 65 will be pushed upwardly by the conventional feeler motion to knock the shipper lever to the position shown in Figure 2 to stop the loom.

The shipper lever has secured thereon a cam member 81 by means of bolts 82 and this cam member has notches 83, 84 and 85 therein, the roller or pin 69 being adapted to rest in notch 83 when the loom is running and being adapted to rest in notch 85 as shown in Figure 2 when the loom is stopped, and in 84 when in neutral position. The upper wall of 85a of notch 85 is disposed at a proper angle to cause the springs 58 and 59 to have enough power to move roller 69 as far into the notch 85 as shown in Figure 2, but not all the way into the notch, so that manual force may be applied to lever 70 to apply more braking effect to stop the loom more quickly than with the parts as shown in Figure 2. The weight of lever 66 and member 67 and the pressing of roller against wall 85 at an angle causes the parts to normally stop in the position shown in Figure 2.

The main purpose of the peculiar shape of cam when in "clutch off brake on" position is to enable the operator when "picking out", or otherwise inching the loom to position by power to be able to stop the loom at the right place with a greater degree of certainty.

The brake band 47 has friction material 47a therein whereby friction is provided between the brakes and the wheel 12.

Although the warp stop motion is not shown, it is evident that many forms of warp stop motions have heretofore been applied to the operation of the shipper lever, therefore, any conventional connection between the warp stop motion and the shipper lever may be used. The above, likewise, applies to side filling stop motions and all other forms of stop motions associated with the shipper lever.

In operation the shipper lever normally occupies a position opposite from that shown in Figure 2 by being swung to the extreme left hand position with the notch 83 resting on roller 69, and in this position the lever 66 is moved downwardly at its outer free end and this gives a slight rotary movement to collar 36 which presses upwardly on pin 43 and presses outwardly on pin 49 and releases the brake band and at the same time arm 35 moves in a counter clockwise direction and dogs 27 are moved out of their associated notches 27a and this forces the wheel 16 against the cork inserts in wheel 14 and imparts motion to the loom, and when the center filling motion is operated, it will knock the shipper lever to the position shown in bold lines in Figure 2 and, likewise, when the shuttle fails to be thrown all the way into the box in the ends of the lay of the loom, the live frog 78 will push projection 76, throw the shipper lever to the position shown in Figure 2 and stop the loom, and also when the filling stop motion is operated, it will force the rod 65 upwardly against projection 80 and, likewise, throw the shipper lever to the position shown in Figure 2 and stop the loom. It will be seen that the brakes will be applied and the clutch will be released instantaneously and simultaneously and the timing of the relation of the application of the brake and the release of the clutch can be adjusted by means of the turnbuckle 32.

It will be noted that the cavity 85 is slightly deeper than is ordinarily necessary and this is provided in order that when in case of emergency the loom should be desired to be stopped very quickly the lever 70 can be pushed further to the right in Figure 2 by hand which will allow the lever 66 to move upwardly further and apply a greater braking effect on the loom.

In the drawing and specification, there has been set forth a preferred embodiment of our invention and although specific terms are employed they are used in a generic and descriptive sense only, and not for purposes of limitation, the scope of the invention being set forth in the appended claims.

We claim:

1. In a loom having a brake and a clutch and a shipper lever adapted to be moved by the stop motions of the loom, means for simultaneously applying the brake and releasing the clutch, tension means for normally forcing the brake applying means against the shipper lever, and means whereby further manual pressure may be applied to the brake after the same is automatically applied by operation of the shipper lever by one of the stop motion means.

2. In a combined clutch releasing and brake applying mechanism for looms, a shipper lever adapted to be moved to stopping position by the various stop motions of a loom, a rotatable collar, a lever extending from said collar to said shipper lever, and having operative engagement therewith, projections on said collar having connection with the brake, another projection on said collar having connection with the clutch whereby the clutch and brake are simultaneously operated when the shipper lever is operated, tension means for normally forcing the lever against the shipper lever, and means whereby manual force may be applied for further operation of the brake.

3. In a loom, means for applying the brakes and releasing the clutch when the shipper lever is operated by one of the stop motions of the loom, a turnably mounted member having arms thereon connected to the brakes and clutch and also having an extended lever thereon for engagement with the shipper lever, tension means for normally forcing said extended lever against the shipper lever and for normally applying the brakes and clutch, and means between the shipper lever and said extended lever whereby manual pressure may be applied to exert further pressure on the brakes.

4. In a combined clutch and brake for a loom, said loom having a shipper lever adapted to be operated by the various stop motions of a loom, a cam on said shipper lever having a plurality of cavities in the face thereof, a shaft mounted on the loom and having a collar loosely mounted thereon, two projections on the collar, connections between the projections and the brake of the loom, a third projection on the collar having connection with the clutch, a lever extending from said collar in close proximity to said cam surface on said shipper lever, adjustable means on the lever for engaging said cavities on said cam, tension means for normally forcing the end of said lever against said cam and to apply the brakes and release the clutch when said lever engages the deepest cavity in said cam when the shipper lever is actuated by one of the stop motions, and means whereby additional pressure may be applied to the brakes by manual pressure on said shipper lever.

5. In a loom having a brake, a clutch, a shipper lever, and a plurality of stop motions for operating the shipper lever to actuate the brakes and clutch, connections between the shipper lever and the brake applying means whereby the shipper lever may be moved manually for a further application of the brakes after the brakes have been applied by the moving of the shipper lever to inoperative position by one of the stop motions.

6. In a loom having a shipper lever and a plurality of stop motions for actuating the shipper lever, said loom also having a brake and a clutch, means simultaneously operable for applying the brakes and releasing the clutch, connections between said brake applying and clutch releasing means and the shipper lever whereby operation of the brake applying and clutch releasing means is effected when one of the stop motions move the shipper lever, and means permitting further manual movement of the shipper lever to allow the further application of the brakes.

7. In a combined brake applying and clutch release for looms having a shipper lever and a plurality of stop motions for actuating the shipper lever, a cam adapted to be secured to the shipper lever and having a plurality of cavities in the surface thereof, one of said cavities being substantially deeper than the others, means cooperating with the cam on the shipper lever for simultaneously applying the brakes and releasing the clutch when any of the stop motions actuate the shipper lever to cause the means to engage the deepest cavity in said cam, said cavity permitting a further manual movement thereof to allow a further application of the brakes.

8. In a loom having a brake, a clutch, a shipper lever and a plurality of stop motions, a lever for simultaneously operating the brake and clutch, said lever extending in close proximity to the shipper lever, adjustable means on the end of the lever next to the shipper lever, an irregular cam secured on the shipper lever and having a relatively shallow cavity therein for engaging said lever for holding the brakes in released condition, a relatively deep cavity in said cam into which said adjustable means are adapted to move when the shipper lever is moved to inoperative position by one of the stop motions, said deep cavity being deep enough to allow further manual movement of the shipper lever for a further application of the brakes after automatic application of the brakes by the moving of the shipper lever by one of the stop motions.

9. In a loom, spring pressed means controlled by a shipper lever for releasing the clutch and applying the brakes for stopping the loom when the operator is shifting the loom to various positions for manual operation, such as "picking out" and similar operations, said means permitting manual pressure to be applied to the shipper lever which is greater than normal pressure exerted by said spring.

10. In a combined clutch release and brake for looms, a lever, brake means connected to said lever for applying a braking effect on the loom, a clutch release mechanism connected to said lever, tension means for normally forcing said brakes to braking position and said clutch release to release position, a shipper lever, a cam secured on the shipper lever and having a plurality of notches in the face thereof, said shipper lever being operable by the stop motions of said loom, means on the free end of said lever having engagement with the face of said cam and said tension means normally forcing the free end of said lever towards said cam, one of said notches being deep enough to permit further manual operation of the brakes after the shipper lever has been moved to a position to apply the brakes.

11. In a loom having a shipper lever and a brake and a clutch, a lever pivotally mounted on said loom and having connections on one end thereof with the brake and clutch, means on the shipper lever having engagement with the other end of said lever, and tension means for moving said lever against the means on the shipper lever.

12. In a loom having a shipper lever and a brake and a clutch release, a lever pivotally mounted intermediate its ends on the loom and having connections at one end thereof with the brake and the clutch release, means on the other end of said lever having operative engagement with the other end of said lever and tension means for normally forcing the other end of said lever against said means on the shipper lever.

13. A single means for applying the brakes to a loom and releasing the clutch thereof, tension means for normally forcing said means to brake applying and clutch release position, means for restraining the single means from brake applying position, and means permitting further manual application of the brakes after they have been applied by said tension means.

14. In a loom having a shipper lever and a brake and a clutch release, unitary means for operating the brake and clutch release comprising a lever pivoted intermediate its ends and having one end thereof connected to the brake and clutch release and having the other end thereof in operative engagement with the shipper lever, and means for normally forcing the unitary means in position to apply the brake and release the clutch, and means permitting further manual application of the brakes after the same have been applied by the forcing means.

15. In a loom having a shipper lever and a brake and a clutch release, interconnected means for moving the brake to one position while moving the clutch release to another position, and means on the interconnected means having operable engagement with the shipper lever whereby the actuation of the shipper lever by one of the stop motions of the loom will allow the inter-connected means to move to brake applying and clutch release position, and means whereby further manual application of the brakes may be effected after the brake is moved to brake applying position.

JOHN G. BENTLEY.
ROBERT A. GIBBS, Jr.
FRANCIS O. GIBBS.